March 27, 1956
W. J. CARLYLE
2,740,034
PRECISION ARTICLE FOR ELECTRIC
RESISTANCE PROJECTION WELDING
Filed Feb. 25, 1954
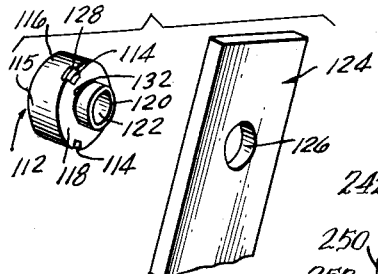
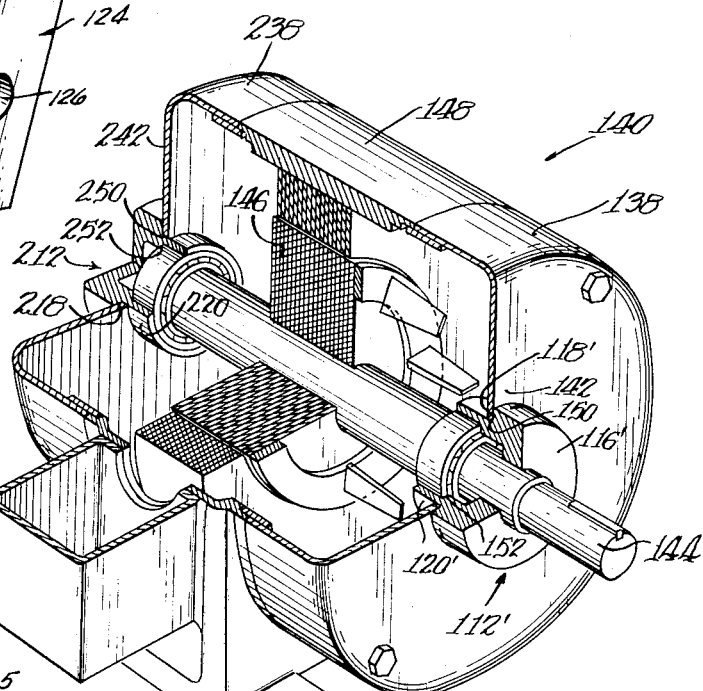
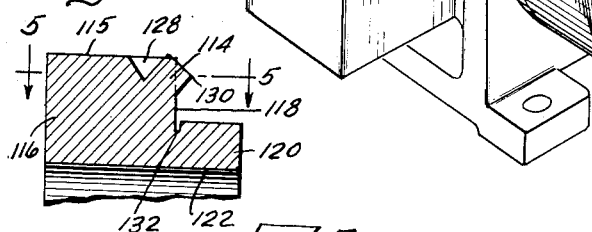
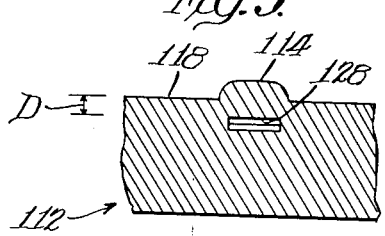
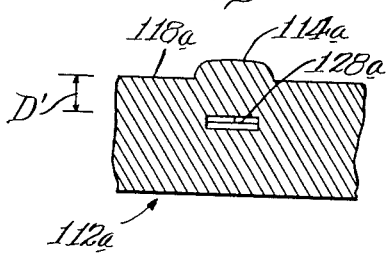
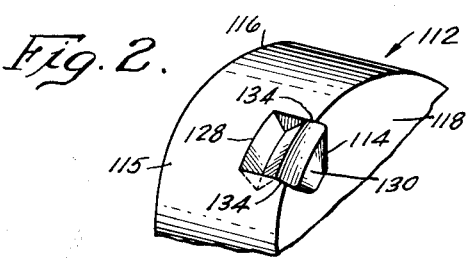
INVENTOR.
William J. Carlyle
BY
Brown, Jackson, Boettcher & Dienner
Attys

United States Patent Office 2,740,034
Patented Mar. 27, 1956

2,740,034

PRECISION ARTICLE FOR ELECTRIC RESISTANCE PROJECTION WELDING

William J. Carlyle, Barrington, Ill., assignor, by direct and mesne assignments, to Richard J. D. Heilshorn, Chicago, Ill.

Application February 25, 1954, Serial No. 412,530

1 Claim. (Cl. 219—10)

My invention relates generally to a new article of manufacture. More particularly, the invention is directed to a precision article adapted to be electric resistance projection welded to another object. This is a continuation-in-part application of my application Serial No. 16,462, filed March 23, 1948, now abandoned.

When a projection welding article is to be welded to another article, particulraly to a sheet or plate, with their complementary or matching surfaces being welded face to face, or when the articles are to be accurately located with respect to each other in all three dimensions, a problem has frequently existed by reason of the inability consistently to control the right amount of "set down" or pressing of one article to the other. That is to say, a satisfactory welded joint within the tolerances specified has not been consistently possible. For example, if a hub is to be secured to the surface of an apertured plate or thin metal sheet with the under side of the main body of the hub flush with (that is, in complete face-to-face engagement with) said surface and with a shank, or pilot, having a close, accurate fit in the aperture, the welding projections of either article which initially space the articles apart may, after melting and welding, form a thickened joint which affects the accuracy of the welded structure. That is to say, the necessary "squareness" and over-all thickness may be adversely affected.

It is an object of my invention to provide against such undesired joints by raising projections from the article on that surface which is adapted to be electric resistance projection welded to another article, such as an apertured plate, for example, and by forming a cavity adjacent each projection. The cavties are then available to fully accommodate the metal of the prejections which recede under pressure. Furthermore, by raising the projections from out of the body of the article itself, for example, from a shoulder, then the electrical current and the welding pressure of the welding operation need only be controlled to the extent that they equal or exceed the amounts required to completely set down the welding projections. If this is done, then in the final assembly the plate will rest tight agains the shoulder from which the projections were originally formed so that this method makes possible the respecting of squareness and location tolerances as are commonly required, for example, in journals where accurate axial and radial location is necessary.

A further advantage of this invention is that the articles may be produced on screw machines; the articles being formed from bar stock or from individual pieces of material. The article so produced can, in a sequence of machine operations, be precisely formed to the desired measurements in all areas, and with the small projections being pulled out from the accurately finished body of the article, thereby assuring that the article retains its precision formation after welding and that the assembled (welded) product has a precision consistent with that of the formation of the article.

A further advantage of my invention is that under circumstances where a condition of heat unbalance normally occurs—for example, where a relatively thick article like a hub is to be secured to a relatively thin member such as a plate or thin metal sheet, the condition of heat unbalance can be eliminated by the article of my invention. Heat unbalance will normally occur where a thick article is to be welded to a plate or sheet, since it is necessary to have a heat input which will adequately heat the thicker article to bring it up to a welding temperature, with such heat input then causing an overheating of the thinner plate or sheet.

While any projection tends to reduce the condition of heat unbalance over that which would result if there were no projection, the article of my invention provides very definite controls so that a condition of heat balance may be obtained under varying conditions.

For example, I pull out from the body of the article the welding projection, or a plurality of spaced projections, and in so doing provide a cavity behind the projection. The cavity serves two purposes:

1. Its volume exactly equals the volume of the welding projection so that, when welding is completed, the welding projection can recede into the cavity and permit a contact weld, with the article and plate having over-all measurements which meet the tolerances required for the particular use of the device.

2. The cavity provides a barrier to the flow of both electricity and heat between the projection and the body of the article. That has two benefits in that the reduced path for electrical flow will cause a quicker heating of the projection and will not require the plate to be overly heated and, secondly, heat developed during welding cannot flow back (be dissipated) into the body of the article as quickly because of the barrier provided by the cavity. Thereby the heat required to make the weld is reduced.

In the foregoing way, I provide a means of controlling the heat balance. A further control is provided since the cavity may be formed at varying distances behind the resulting projection, thereby varying the mass of the metal which will be intensely heated during the welding operation. Furthermore, the depth of the cavity forms another degree of control over the affected mass which is to be heated to the welding temperature.

Still a further measure of control may be provided by so pulling the projections from the body of the article that either a fracture is produced in one or more places between the projection and the body, or at least the grain structure is so affected that the path of electrical flow and of heat between the projection and the body of the article is additionally restricted.

Where, for example, the article has a shank and a body portion with a precise surface constituting a shoulder on the body portion around the shank for being welded to an apertured plate or sheet, and where the projections are pulled forward out of the shoulder at the periphery of the body portion, then the restriction provided by my invention on the flow of heat back into the body from the heated projection permits the relatively cold precision shoulder to form an accurate "stop," or control, on the "set down."

Other objects, uses and advantages will be obvious or become apparent from a consideration of the following description and drawings in which:

Figure 1 shows an article formed according to my invention and an object to which it is adapted to be welded;

Figure 2 is an enlarged fragmentary view of the article of Figure 1;

Figure 3 is an enlarged, fragmentary, sectional view of the article of Figure 1;

Figure 4 shows the precision article of my invention as applied to an electric motor, portions of the motor being broken away to show the interior;

Figure 5 is a fragmentary, sectional view on the line 5—5 of Figure 3; and

Figure 6 is a fragmentary, sectional view similar to that of Figure 5, but showing the cavity farther back from the shoulder of the article.

Apparatus and a method which may be used to produce the article claimed herein are the subject of my copending application, Serial No. 256,198, filed November 14, 1951, a division of application Serial No. 16,462, mentioned above. Of course, the article may be produced in other ways.

If reference will now be made to Figures 1 and 2, there will be seen an article, indicated generally by the reference numeral 112, which has been formed with three welding projections 114 equally spaced about the body portion 116 of the article and extending forwardly of a precision surface for example, from the surface 118 of an accurately machined shoulder which is located between the body portion 116 and its integral shank, or pilot, 120 which is also accurately machined prior to formation of the projections. Wall 115 extends rearwardly from surface 118 and the welding projections 114 are formed at the junction of surface 118 and wall 115. A passageway such as the bore 122 may be formed along the longitudinal axis of the article 112 in order to provide a hub in a plate, such as the plate indicated by reference numeral 124, which has an aperture 126 in which the shank 120 of the article 112 is adapted to be closely fitted. It will be apparent that one or more bearing surfaces, not constituting through passageways, could be located in the body portion 116, or in the shank, or both, in place of passageway 122. The applicability of my invention, in the absence of shank 120 of bore 122, will also be apparent.

If reference will be made to Figure 2, it will be seen that each projection 114 extends forwardly from surface 118 as the result of having been raised, or pulled out, from the body 116 of the article, at the junction of wall 115 and the surface 118, by a sharp instrument, such as one of the toothed elements 40 of the tool 10 described in my copending application Serial No. 256,198, filed November 14, 1951. The formation of the projection 114 simultaneously results in the formation of a cavity 128 longitudinally adjacent (that is, behind) each projection 114. The projection may be said to overlie the cavity which extends into the body portion from the rearwardly extending wall 115. It will be noted that each cavity and its projection are in line with the direction in which pressure will be exerted by the resistance welding machine when the article 112 is being electric resistance projection welded to an object such as apertured plate 124. Consequently, when the welding operation takes place and the projection 114 is melted, any metal not needed to form the junction may be pressed back into the cavity 128 so that the plate 124 and surface 118 of the shoulder of article 112 will become welded with their adjoining surfaces flush, instead of spaced apart by any excess metal resulting from the projections. Each cavity 128, therefore, supplies a relief area.

A further advantage of each cavity, as mentioned in the opening paragraphs of this specification, is to provide accurate heat balance. This is important where an article such as the hub 112' is to be accurately welded to the end bell 138 of an electric motor 140 (see Figure 4). The end bell might be formed either as a thin walled casting or as a stamping. In either event, its wall 142 is much thinner than the body portion 116' of the hub 112'. If my invention were not employed, the heat input necessary for heating the thick hub to a welding temperature would greatly exceed that necessary to heat up the adjacent thin wall 142. Undesired melting or deformation of the wall might result.

By forming projections out of the body portion 116', with resulting cavities, the path of electrical flow to the projections is restricted, since flow is not possible through the cavities themselves. The restricted path, or resistance, increases the heating effect on the projections so that they heat more rapidly. Also, the heat generated cannot as easily flow back into the body portion 116', where it would be dissipated, since the path of heat flow is also restricted by the presence of the cavities which act as barriers. Therefore, less heat input is needed. The accurately machined shoulder 118' remains relatively cold and thereby forms an accurate stop, or control, during the "set down" portion of the welding operation.

By my invention the mass of each projection and control over the flow of electrical current into it is dependent upon how far behind the shoulder the cavity is formed. For example, in Figure 5 it will be seen that the center of the cavity 128 lies a distance "D" behind the surface 118 of the shoulder whereas in Figure 6 the cavity 128a begins a distance D' behind the face of the shoulder 118a. The mass of the respective projections 114 and 114a is therefore varied. As is further apparent from considering Figures 2, 3, 5, and 6, the mass of a projection and the path for flow of electricity and heat is also variable by varying the depth and width of the cavity. And whatever the size and shape of cavity selected for the particular projection to be formed, the cavity always has a volume corresponding to that of the projection so that melted metal of the projection may recede into the cavity to prevent build up of undesired thickness of metal between the welded surfaces. That is extremely important where close tolerances are required in the welded assembly.

An example of a structure where close tolerances are essential is shown in Figure 4 where hubs 112' and 212 are to be welded to the end bells 138 and 238 of the motor 140. It is very important that the final assembly provide for precise location of the shaft 144 of the rotor 146. The hubs 112' and 212 must locate the central axis of the shaft accurately in three dimensions that is, two directions in the plane of the end bells 138 and 238 and also axially of the shaft to prevent end play. So, with the end bells having been precisely formed to align their apertures with the central axis of the motor housing 148, it is essential that the hubs 112' and 212 be precisely formed so that the shaft and its bearings will be accurately positioned radially and axially within the housing 148.

The shanks 120' and 220 must fit accurately within the respective accurately aligned apertures 150 and 250 of end bells 138 and 238. Consequently, the shanks are precisely machined and smooth so that they may be inserted into the apertures 150 and 250. Also, the surfaces 118' and 218 of the shoulders of the hubs 112' and 212 must accurately fit against the complementary flat surfaces of walls 142 and 242 of the end bells 138 and 238, respectively. So, the shoulders 118' and 218 are precisely machined and are made normal to the surface of the shanks 120' and 220. Since the internal shoulders 152 and 252 of hubs 112' and 212 must be spaced apart a certain distance, it is essential that, during the welding of surfaces 118' and 218 to walls 142 and 242, no excess metal builds up between those surfaces and walls. Otherwise, the internal shoulders 152 and 252, for example, will not be accurately spaced from each other. Also, the build up of any excess metal might misalign the hubs so that they would not be exactly normal, or "square," with respect to the parallel walls 142 and 242 of the end bells.

The use of the article of my invention results in such close tolerances being achieved whereas articles of the prior art do not. By forming the projections by pulling them forward from the previously machined shoulder, any metal of the projections not needed for the junction, or weld, will recede into the cavities which correspond in volume to the volume of the projections. As the welding pressure causes the excess metal to recede, the relatively cold shoulders having the surfaces 118' and 218 will meet the complementary or matching surfaces 142 and 242 of the end bells. The shoulders will serve as a "stop" or "limit" and will be welded flush to the walls 142 and 242, that is, with no space or excess metal intervening between the surfaces of the shoulders and walls. The hubs will therefore be accurately aligned in all three directions with respect to walls 142 and 242.

Since the location and size of the cavities and the corresponding projections may be varied depending upon the relative thicknesses of the articles to be welded together, accurate heat balance is assured along with obtaining close tolerances in the finished assembly.

Referring again to Figure 2, it is possible in forming the projections 114 to cause cleavage lines as indicated at 134 so that side walls of the projection 114 are fractured or separated from the body 116 of the article 112 thus providing, if desired, even a more limited path for the flow of electricity during the resistance-welding operation. Also, the path through which heat may flow from the projections is more limited so heat loss to the body of the article is reduced.

It will be appreciated that the article illustrated and described is merely by way of example and that a variety of articles coming within the scope of my invention may be formed for use in electric resistance projection welding operations. It is not necessary that the article be formed of bar stock since it may also be formed of tubular stock and stock having cross-sections of regular or irregular outline. For the purposes of the application the foregoing varieties of stock, and others similar thereto, from which articles may be formed are designated as stock having a longitudinally extending axis. Also the projections might be formed as a single annular projection pulled forward from the shoulder all around.

The foregoing description and the drawings are given merely to explain and illustrate my invention, and the manner in which it may be performed, and the invention is not to be limited thereto, except insofar as the appended claim is so limited, since those skilled in the art who have my disclosure before them will be enabled to make modifications and variations therein without departing from the scope of the invention.

I claim:

An article for electric resistance projection welding comprising a body portion having a thickness greater than that of an object to which it is adapted to be welded, a surface on said body portion formed to match the surface on the object to which the article is adapted to be welded, a wall on the body portion extending rearwardly from said surface of the article, projection welding means extending forwardly of said surface from the body portion at the junction of said surface and said wall, and cavity means extending into said body portion from said wall and being overlaid by said projection welding means, said cavity means having a shape generally the same as the shape of the projection welding means and having a volume not less than the volume of said projection welding means.

References Cited in the file of this patent

UNITED STATES PATENTS

| | | |
|---|---|---|
| 2,054,187 | Almdale | Sept. 15, 1936 |
| 2,443,815 | Pahl | June 22, 1948 |

FOREIGN PATENTS

| | | |
|---|---|---|
| 678,141 | Great Britain | Aug. 27, 1952 |